United States Patent
Nakajima et al.

(10) Patent No.: US 6,187,896 B1
(45) Date of Patent: Feb. 13, 2001

(54) AROMATIC POLYCARBONATE COMPOSITION

(75) Inventors: Masayuki Nakajima; Katsushige Hayashi, both of Ibaraki; Michio Kawai, Tokyo; Junji Takano, Fukuoka, all of (JP)

(73) Assignees: Mitsubishi Gas Chemical Company, Inc.; Mitsubishi Chemical Corporation, both of Tokyo (JP)

( * ) Notice: Under 35 U.S.C. 154(b), the term of this patent shall be extended for 0 days.

(21) Appl. No.: 09/468,368

(22) Filed: Dec. 21, 1999

(30) Foreign Application Priority Data

Dec. 22, 1998 (JP) .................................................. 10-365099

(51) Int. Cl.$^7$ .................................................. C08G 64/00
(52) U.S. Cl. .......................................... 528/198; 528/196
(58) Field of Search ....................................... 528/196, 198

(56) References Cited

FOREIGN PATENT DOCUMENTS 3-265625    11/1991   (JP) .
9-100346     4/1997   (JP) .

*Primary Examiner*—Terressa M. Boykin

(74) *Attorney, Agent, or Firm*—Sughrue, Mion, Zinn, Macpeak & Seas, PLLC

(57) ABSTRACT

An aromatic polycarbonate composition which has excellent thermal stability and maintains high transparency and a satisfactory hue even at high temperatures. The aromatic polycarbonate composition comprises: a polycarbonate obtained by reacting at least one aromatic dihydroxy compound with a compound capable of incorporating a carbonate bond; and a phosphorus compound represented by the following formula (1):

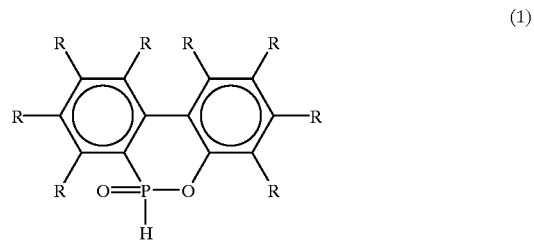

(1)

wherein the eight R's may be the same or different and each represents a hydrogen atom or an optionally substituted, aliphatic or aromatic, univalent group having 1 to 18 carbon atoms.

8 Claims, No Drawings

AROMATIC POLYCARBONATE COMPOSITION

FIELD OF THE INVENTION

The present invention relates to an aromatic polycarbonate composition. More particularly, this invention relates to an aromatic polycarbonate composition excellent in hue and thermal stability.

BACKGROUND OF THE INVENTION

Known as representative prior art techniques for producing an aromatic polycarbonate are processes in which 2,2-bis(4-hydroxyphenyl)propane (hereinafter abbreviated as bisphenol A) is reacted with a compound capable of incorporating a carbonate bond, such as phosgene or a carbonic diester. Of those processes, a transesterification process has advantages in operation and cost over a phosgene process (interfacial polymerization process) because the steps thereof are relatively simple. In addition, the transesterification process has recently come to be thought better of from the standpoint of environmental protection, because neither phosgene, which is highly toxic, nor a halogenated solvent, e.g., methylene chloride, is used in the process.

However, practical use of the transesterification process for large-scale industrial production is still limited because it has some drawbacks over the phosgene process concerning polycarbonate properties and the process itself. In particular, a serious problem concerning properties of the polycarbonate obtained by the transesterification process is that the hue of the polycarbonate deteriorates upon heating.

Various investigations have been made so far in order to overcome the above problem. Examples thereof include addition of an acidic compound and an epoxy compound (see JP-A-4-175368; the term "JP-A" as used herein means an "unexamined published Japanese patent application"), addition of a phosphite compound (see JP-A-3-265625), and addition of a hindered phenol compound (see JP-A-4-41525). However, even with the incorporation of these additives into a polycarbonate, it has still been difficult to obtain a polycarbonate composition having sufficient thermal stability.

SUMMARY OF THE INVENTION

In view of the problems described above, an object of the present invention is to provide a highly thermally stable, aromatic polycarbonate composition which maintains high transparency and a satisfactory hue even in a high temperature and high humidity atmosphere and is suitable for use in applications such as optical disks and medical apparatuses.

As a result of intensive investigations in seeking for more effective additives, it has been found that exceedingly high thermal stability can be imparted to a polycarbonate by adding thereto a given amount of a phosphorus compound having a structure represented by the following formula (1). The present invention has been completed based on this finding.

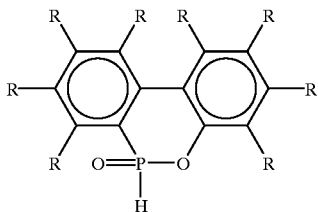

(1)

wherein the eight R's may be the same or different and each represent a hydrogen atom or an optionally substituted, aliphatic or aromatic, univalent group having 1 to 18 carbon atoms.

Accordingly, the present invention provides an aromatic polycarbonate composition comprising: a polycarbonate obtained by reacting at least one aromatic dihydroxy compound with a compound capable of incorporating a carbonate bond; and a phosphorus compound represented by the above formula (1).

DETAILED DESCRIPTION OF THE INVENTION

The polycarbonate as a constituent component of the composition of the present invention is obtained by reacting at least one aromatic dihydroxy compound with a compound capable of incorporating a carbonate bond. The "aromatic dihydroxy compound" is represented by the following general formula (2):

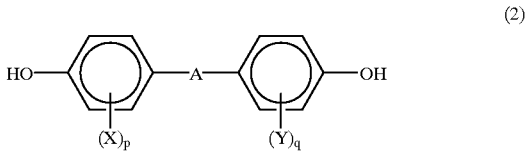

(2)

wherein A is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms or a bivalent atom or group represented by —O—, —S—, —CO—, —SO— or —SO$_2$—; X and Y are the same or different and each are a halogen atom or a hydrocarbon group having 1 to 6 carbon atoms; and p and q are the same or different and each are an integer of 0 to 2.

Typical examples of the aromatic dihydroxy compound include bisphenols such as bis(4-hydroxyphenyl)methane, 2,2-bis(4-hydroxyphenyl)propane [bisphenol A], 2,2-bis(4-hydroxy-3-methylphenyl)propane, 2,2-bis(4-hydroxy-3-t-butylphenyl) propane, 2,2-bis(4-hydroxy-3,5-dimethylphenyl)propane, 2,2-bis(4-hydroxy-3,5-dibromophenyl)propane,4,4-bis(4-hydroxyphenyl)heptane, and 1,1-bis(4-hydroxyphenyl)-cyclohexane; biphenols such as 4,4'-dihydroxybiphenyl and 3,3',5,5'-tetramethyl-4,4'-dihydroxybiphenyl; and bis(4-hydroxyphenyl) sulfone, bis(4-hydroxyphenyl) sulfide, bis (4-hydroxyphenyl) ether, and bis(4-hydroxyphenyl) ketone. Of those, bisphenol A is preferable. Although those aromatic dihydroxy compounds are generally used alone, a mixture of two or more of those may be used according to need to obtain a copolymer.

Typical examples of the "compound capable of incorporating a carbonate bond" include phosgene; carbonic diesters such as diphenyl carbonate, di-p-tolyl carbonate, phenyl p-tolyl carbonate, dimethyl carbonate and diethyl carbonate;

and the bischloroformates of aromatic dihydroxy compounds. Of those, phosgene and diphenyl carbonate are preferable.

Where a carbonic diester is used in the reaction (transesterification process) as the compound capable of incorporating a carbonate bond, a dicarboxylic acid or a dicarboxylic acid ester may be used together with the carbonic diester in an amount of preferably 50 mol % or smaller, and more preferably 30 mol % or smaller. Examples of the dicarboxylic acid or dicarboxylic acid ester include terephthalic acid, isophthalic acid, diphenyl terephthalate and diphenyl isophthalate. Where such a carboxylic acid or carboxylic acid ester is used in combination with a carbonic diester, a polyester carbonate is obtained.

Where phosgene is used in the reaction (phosgene process) as the compound capable of incorporating a carbonate bond, this reaction is generally conducted in the presence of an acid acceptor and a solvent. Examples of the acid acceptor include alkali metal hydroxides such as sodium hydroxide and potassium hydroxide, and pyridine. Examples of the solvent include halogenated hydrocarbons such as methylene chloride and chlorobenzene. For the purpose of accelerating the reaction, a catalyst may be used, such as a tertiary amine or a quaternary ammonium salt. It is desirable to use as a molecular weight regulator a chain terminator such as phenol, p-t-butylphenol, p-cumylphenol or isooctylphenol. The reaction is preferably conducted at a temperature of generally from 0 to 40° C. for from several minutes to 5 hours while maintaining the pH of the system generally at 10 or higher.

Where the aromatic dihydroxy compound and the carbonic diester are subjected to melt polycondensation to produce a polycarbonate by the transesterification process, a catalyst is generally used. In polycarbonate production according to the present invention, there is no limitation on the kind of catalyst. However, catalysts generally used are basic compounds such as alkali metal compounds, alkaline earth metal compounds, basic boron compounds, basic phosphorus compounds, basic ammonium compounds and amine compounds. Those may be used alone or in combination of two or more thereof. The amount of the catalyst used is generally from $1\times10^{-9}$ to $1\times10^{-3}$ mol, and preferably from $1\times10^{-7}$ to $1\times10^{-4}$ mol, per mole of the aromatic dihydroxy compound.

Examples of the alkali metal compounds include inorganic alkali metal compounds such as the hydroxides, carbonates and hydrogen carbonates of lithium, sodium, potassium, rubidium and cesium, and organic alkali metal compounds such as the salts of these alkali metals with alcohols, phenols and organic carboxylic acids. Of those alkali metal compounds, cesium compounds are preferable. Specifically, the most preferred cesium compounds are cesium carbonate, cesium hydrogen carbonate and cesium hydroxide.

Examples of the alkaline earth metal compounds include inorganic alkaline earth metal compounds such as the hydroxides and carbonates of beryllium, magnesium, calcium, strontium and barium, and organic alkaline earth metal compounds such as the salts of these alkaline earth metals with alcohols, phenols and organic carboxylic acids.

Examples of the basic boron compounds include the sodium salts, potassium salts, lithium salts, calcium salts, magnesium salts, barium salts, and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compounds include triethylphosphine, tri-n-propylphosphine, triisopropylphosphine, tri-n-butylphosphine, triphenylphosphine and quaternary phosphonium salts.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide.

Examples of the amine compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

Of those catalysts, alkali metal compounds are desirable for practical use.

The transesterification reaction is generally conducted in two or more stages in the following manner. In the first stage, the reactants are reacted under ordinary or a reduced pressure at a temperature of generally from 140 to 260° C., and preferably from 180 to 240° C., for generally from 0.1 to 5 hours, and preferably from 0.5 to 3 hours. Subsequently, the reaction temperature is elevated while increasing the degree of vacuum of the reaction system. Finally, polycondensation is conducted under a reduced pressure of 1 mmHg or lower at a temperature of from 240 to 320° C. This reaction may be conducted either batchwise or continuously, or a combination of a batch process and a continuous process may be used. For carrying out the reaction, any of tank type, tubular and columnar reactors may be used.

The polycarbonate for use in the present invention has a viscosity average molecular weight ($M_v$) of preferably from 10,000 to 100,000, and more preferably from 12,000 to 40,000.

Where the catalyst, particularly the alkali metal compound catalyst, is used, a sulfur-containing acidic compound or derivatives thereof are preferably used as a deactivator for the catalyst in the transesterification reaction. The amount of the deactivator used is 0.5 to 10 equivalents, and preferably 1 to 5 equivalents, per one equivalent of the catalyst metal. In other words, the deactivator is added in an amount of generally 1 to 100 ppm, and preferably 1 to 20 ppm, based on the weight of the polymer.

The sulfur-containing acidic compound or derivatives thereof are, for example, sulfonic acid, sulfinic acid, sulfuric acid or their esters. Representative examples thereof include dimethyl sulfate, diethyl sulfate, p-toluenesulfonic acid, their methyl, ethyl, butyl, octyl and phenyl esters, benzene sulfonic acid, its methyl, ethyl, butyl, octyl, phenyl and dodecyl esters, benzenesulfinic acid, toluenesulfinic acid and naphthalenesulfonic acid. Of those compounds, ester of p-toluenesulfonic acid or ester of benzenesulfonic acid is preferable. Those compounds may be used alone or as mixtures of two or more thereof.

Addition of the sulfur-containing acidic compound or derivatives thereof can be carried out by optional method.

For example, the sulfur-containing acidic compound or derivatives thereof can be added to a molten or solid state polycarbonate directly or after diluting the same with a diluent, and dispersed therein. Specifically, the sulfur-containing acidic compound or derivatives thereof can be mixed by supplying the same in a polycondensation vessel, a transfer line or an extruder. Of course, the sulfur-containing acidic compound or derivatives thereof can be mixed with pellets, powder or the like with a mixer or the like, and the resulting mixture can be supplied to the extruder or the like, followed by kneading. Where a vacuum treatment by vent is conducted in the extruder, water is added or various additives such as heat stabilizers, release agents, dyes, pigments, ultraviolet absorbers, antistatic agents, antifogging agents or organic or inorganic fillers are added, those addition and treatment may be conducted simultaneously with addition of the sulfur-containing acidic compound or derivatives thereof. However, it is preferable that prior to those addition and treatment, the sulfur-containing compound or derivatives thereof are added and the resulting mixture is further kneaded.

In the present invention, the content of the phosphorus compound represented by the following formula (1) is generally from 5 to 500 ppm, and preferably from 10 to 300 ppm, based on the weight of the polycarbonate. If the content of the phosphorus compound is lower than the lower limit, the expected effects are not obtained. If the content thereof is excess, it is undesirable in that moisture resistance and mechanical properties of the composition becomes lower.

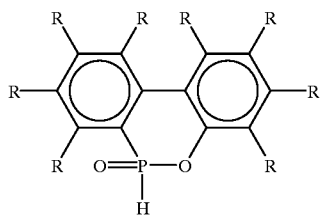

(1)

wherein the eight R's may be the same or different and each represent a hydrogen atom or an optionally substituted, aliphatic or aromatic, univalent group having 1 to 18 carbon atoms.

Typical examples of the phosphorus compound include 9,10-dihydro-9-oxa-10-phosphaphenanthrene 10-oxide, 1-methyl-9,10-dihydro-9-oxa-10-phosphaphenanthrene 10-oxide, 2-methyl-9,10-dihydro-9-oxa-10-phosphaphenanthrene 10-oxide, 8-methyl-9,10-dihydro-9-oxa-10-phosphaphenanthrene 10-oxide, 1,8-dimethyl-9,10-dihydro-9-oxa-10-phosphaphenanthrene 10-oxide, 1,2,3,4,5,6,7,8-octamethyl-9,10-dihydro-9-oxa-10-phosphaphenanthrene 10-oxide, 1-phenyl-9,10-dihydro-9-oxa-10-phosphaphenanthrene 10-oxide, and 1,8-diphenyl-9,10-dihydro-9-oxa-10-phosphaphenanthrene 10-oxide. Especially preferred of these is 9,10-dihydro-9-oxa-10-phosphaphenanthrene 10-oxide.

There are no limitations on the time when the phosphorus compound is added and on methods for the addition. In the transesterification process, however, the highest effects are obtained when the phosphorus compound is added to the molten polycarbonate during or after polymerization. Examples of addition methods in this case include a method in which the phosphorus compound is directly added without being diluted, a method in which the phosphorus compound is added after having been diluted with an appropriate solvent, and a method in which the phosphorus compound is added in the form of a pelletized or flaky master batch. It is also possible to use a method in which the phosphorus compound is pelletized first and then added to the polycarbonate by kneading the polycarbonate together with the pelletized phosphorus compound with an extruder or the like. In an interfacial polymerization process, on the other hand, an appropriate addition method is to first form the phosphorus compound into flakes and then add the same by kneading the polycarbonate together with the flakes with an extruder or the like. If desired and necessary, the phosphorus compound may be used in combination with a catalyst deactivator, heat stabilizer other than the phosphorus compound, release agent, ultraviolet absorber, colorant, antistatic agent, etc.

The present invention will be explained below in more detail by reference to the following Examples, but the invention should not be construed as being limited to the following Examples in any way.

Analyses were conducted by the following methods.
(1) Molecular Weight

Intrinsic viscosity [η] in 20° C. methylene chloride was measured with an Ubbelohde viscometer. The molecular weight of the sample was determined using the following equation.

$$[\eta]=1.23\times10^{-4}\times(M_v)^{0.83}$$

(2) Hue (Initial YI)

A molded sheet having a thickness of 3 mm was examined with SC-1, manufactured by Suga Test Instruments Co., Ltd. to determine the YI (the smaller the value of YI, the better the hue).

(3) Heat Aging Test

A molded sheet having a thickness of 3 mm was placed in Geer oven GHPS-212, manufactured by Tabai Espec Corp., in the air at 140° C. for 100 hours and then examined for YI with SC-1, manufactured by Suga Test Instruments Co., Ltd.

(4) Humidity Resistance Test

A molded sheet having a thickness of 3 mm was placed in autoclave BS-325, manufactured by Tomy Kogyo Co., Ltd., at 120° C. for 100 hours and then examined for haze with hazeometer 1001DP, manufactured by Nippon Denshoku Industries Co., Ltd

EXAMPLE 1

Bisphenol A was mixed with diphenyl carbonate in a given molar proportion (DPC/BPA=1.040) through melt mixing in a nitrogen atmosphere. In a nitrogen atmosphere having ordinary pressure, this molten mixture was continuously fed, at a rate of 88.7 kg/hr through a feedstock introduction pipe, to a first vertical stirring polymerizer maintained at 210° C. The liquid level in the polymerizer was maintained constant while controlling the degree of opening of the valve disposed in a polymer discharge line at the polymerizer bottom so as to regulate the average residence time to 60 minutes. Simultaneously with the initiation of the feedstock mixture feeding, a 0.02 wt % aqueous solution of cesium carbonate as a catalyst began to be continuously fed at a rate of 320 ml/hr (1×10⁻⁶ mol per mole of the bisphenol A). The reaction mixture discharged from the polymerizer bottom was subsequently fed successively to second, third and fourth vertical polymerizers arranged in series and then to a fifth horizontal polymerizer. During the reaction, the liquid level in each polymerizer was regulated so as to result in an average residence time of 60 minutes and the phenol which was generated as a by-product was distilled off.

In the second to fifth polymerizers, the polymerization was conducted under conditions such that the temperature and the degree of vacuum became higher and the rate of stirring became lower with the progress of the reaction. Specifically, the polymerization conditions for the second polymerizer were 210° C., 100 Torr and 200 rpm; those for the third polymerizer were 240° C., 15 Torr and 100 rpm; those for the fourth polymerizer were 270° C., 0.5 Torr and 44 rpm; and those for the fifth polymerizer were 280° C., 0.5 Torr and 10 rpm. The rate of polycarbonate production was 50 kg/hr. The polycarbonate thus obtained had a molecular weight $M_v$ of 21,500.

The thus-obtained polymer which was still in a molten state was continuously introduced into a 46 mm twin-screw extruder manufactured by Kobe Steel, Ltd. Further, 9,10-dihydro-9-oxa- 10-phosphaphenanthrene 10-oxide (manufactured by Sanko Co., Ltd.) was added thereto in a master batch form through a side compactor attached to the extruder in an amount of 30 ppm based on the weight of the polycarbonate. The resulting mixture was kneaded and then pelletized with a pelletizer.

The pellets obtained were dried at 120° C. for 6 hours or more in a nitrogen atmosphere and then molded at 280° C. into a 3 mm thick sheet with injection molding machine J-100, manufactured by The Japan Steel Works, Ltd. The sheet molded had a YI of 1.51 and a haze of 0.6. It had a YI after the heat aging test of 2.88 and a haze after the humidity resistance test of 0.7.

EXAMPLES 2 TO 4

Polycarbonate compositions were produced in the same manner as in Example 1 except that the amount of 9,10-dihydro-9-oxa-10-phosphaphenanthrene 10-oxide added was changed as shown in the Table below. The results of property evaluations of the compositions are shown in the Table below.

Comparative Example 1

A polycarbonate composition was produced in the same manner as in Example 1 except that 9,10-dihydro-9-oxa-10-phosphaphenanthrene 10-oxide was not added. The results of property evaluations of the composition are shown in the Table below.

Comparative Example 2

A polycarbonate composition was produced in the same manner as in Example 1 except that tris(2,4-di-t-butylphenyl) phosphite (trade name, Adekastab 2112; manufactured by Asahi Denka Kogyo K.K.) was added in an amount of 200 ppm in place of 9,10-dihydro-9-oxa-10-phosphaphenanthrene 10-oxide. The results of property evaluations of the composition are shown in the Table below.

EXAMPLE 5

A hundred parts of a flaky polycarbonate produced from 2,2-bis(4-hydroxyphenyl)propane by the phosgene process (interfacial polymerization process) (Iupilon S-3000F (trade name); $M_v$=21,500) was mixed with 0.003 parts of 9,10-dihydro-9-oxa-10-phosphaphenanthrene 10-oxide. This mixture was sufficiently homogenized with a supermixer to obtain a sample. This sample was introduced with a gravimetric feeder into a 46 mm twin-screw extruder manufactured by Kobe Steel, Ltd. at a rate of 50 kg/hr to pelletize the sample. The results of property evaluations of the composition are shown in the Table below.

Comparative Example 3

A polycarbonate was pelletized in the same manner as in Example 5 except that 9, 10-dihydro-9-oxa-10-phosphaphenanthrene 10-oxide was not added. The results of property evaluations of the composition are shown in the Table below.

EXAMPLE 6

A polymer polymerized in the same manner as in Example 1 which was still in a molten state was continuously introduced into a 46 mm twin-screw extruder manufactured by Kobe Steel, Ltd. Further, using two side feed compactors attached to the extruder, n-butyl p-toluenesulfonate was added thereto as a catalyst deactivator in a batch form through the first side feed compactor in an amount of 5.4 ppm (3 equivalents to the metal component of the catalyst in the polymer) based on the weight of the polycarbonate, and 9,10-dihydro-9-oxa-10-phosphaphenanthrene 10-oxide was then added thereto in a batch form through the second side feed compactor in an amount of 100 ppm based on the weight of the polycarbonate. The resulting mixture was kneaded and then pelletized with a pelletizer to form pellets.

The results of property evaluations of the polycarbonate composition obtained are shown in the Table below.

TABLE

| | Ex. 1 | Ex. 2 | Ex. 3 | Ex. 4 | Comp. Ex. 1 | Comp. Ex. 2 | Ex. 5 | Comp. Ex. 3 | Ex. 6 |
|---|---|---|---|---|---|---|---|---|---|
| Kind of additive | HCA | HCA | HCA | HCA | — | A2112 | HCA | — | HCA |
| Amount (ppm) | 30 | 100 | 300 | 800 | — | 200 | 30 | — | 100 |
| Kind of catalyst deactivator | — | — | — | — | — | — | — | — | PTSB |
| Amount of catalyst deactivator (ppm) | — | — | — | — | — | — | — | — | 5.4 |
| Initial YI | 1.51 | 1.48 | 1.45 | 1.56 | 1.75 | 1.41 | 1.74 | 1.85 | 1.40 |
| YI after heat aging | 1.88 | 1.82 | 1.95 | 2.11 | 3.41 | 2.86 | 2.13 | 2.74 | 1.77 |

TABLE-continued

|  | Ex. 1 | Ex. 2 | Ex. 3 | Ex. 4 | Comp. Ex. 1 | Comp. Ex. 2 | Ex. 5 | Comp. Ex. 3 | Ex. 6 |
|---|---|---|---|---|---|---|---|---|---|
| ΔYI | 0.37 | 0.34 | 0.50 | 0.55 | 1.66 | 1.45 | 0.39 | 0.89 | 0.37 |
| Initial haze (%) | 0.3 | 0.3 | 0.3 | 0.3 | 0.3 | 0.3 | 0.3 | 0.3 | 0.3 |
| Haze after humidity resistance test (%) | 0.6 | 0.7 | 0.8 | 1.5 | 0.6 | 3.8 | 0.7 | 0.6 | 0.7 |

HCA: 9,10-dihydro-9-oxa-10-phosphaphenanthrene 10-oxide
A2112: tris(2,4-di-t-butylphenyl) phosphite
PTSB: n-butyl p-toluenesulfonate
ΔYI = (YI after heat aging) − (initial YI)

According to the present invention, a highly heat-resistant aromatic polycarbonate composition is obtained by adding a phosphorus compound represented by the following formula (1) to a polycarbonate obtained by reacting at least one aromatic dihydroxy compound with a compound capable of incorporating a carbonate bond, in an amount of from 5 to 500 ppm based on the weight of the polycarbonate.

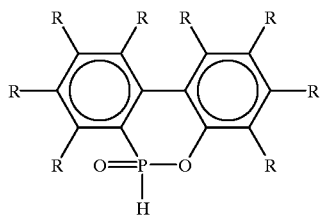

(1)

wherein the eight R's may be the same or different and each represent a hydrogen atom or an optionally substituted, aliphatic or aromatic, univalent group having 1 to 18 carbon atoms.

While the invention has been described in detail and with reference to specific embodiments thereof, it will be apparent to one skilled in the art that various changes and modifications can be made therein without departing from the spirit and scope thereof.

What is claimed is:

1. An aromatic polycarbonate composition comprising: a polycarbonate obtained by reacting at least one aromatic dihydroxy compound with a compound capable of incorporating a carbonate bond; and a phosphorus compound represented by the following formula (1):

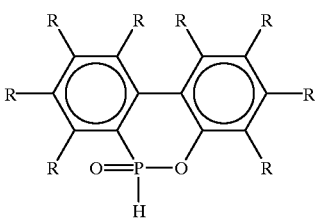

(1)

wherein the eight R's may be the same or different and each represent a hydrogen atom or an optionally substituted, aliphatic or aromatic, univalent group having 1 to 18 carbon atoms.

2. The aromatic polycarbonate composition as claimed in claim 1, wherein said phosphorus compound is present in an amount of from 5 to 500 ppm based on the weight of the polycarbonate.

3. The aromatic polycarbonate composition as claimed in claim 1, wherein said phosphorus compound is 9,10-dihydro-9-oxa-10-phosphaphenanthrene 10-oxide.

4. The aromatic polycarbonate composition as claimed in claim 1, wherein said polycarbonate is obtained by subjecting at least one aromatic dihydroxy compound and a carbonic diester to melt polycondensation.

5. The aromatic polycarbonate composition as claimed in claim 4, wherein said melt polycondensation is conducted in the presence of a catalyst.

6. The aromatic polycarbonate composition as claimed in claim 5, wherein said catalyst is used in an amount of $1 \times 10^{-7}$ to $1 \times 10^{-4}$ mol per mole of the aromatic dihydroxy compound.

7. The aromatic polycarbonate composition as claimed in claim 5, wherein a sulfur-containing acidic compound or derivatives thereof are further present as a catalyst deactivator in the melt polycondensation.

8. The aromatic polycarbonate composition as claimed in claim 7, wherein said catalyst deactivator is used in an amount of 1 to 5 equivalents to one equivalent of the catalyst.

* * * * *